United States Patent Office 3,491,153
Patented Jan. 20, 1970

3,491,153
PROCESSES FOR PREPARATION OF ALLYLIC ALCOHOLS, ALLYLIC ETHERS, AND ALKYL METHYL KETONES
Warren Irl Lyness, Mount Healthy, Ohio, assignor to The Procter & Gamble Company, Cincinnati, Ohio, a corporation of Ohio
No Drawing. Filed Aug. 21, 1967, Ser. No. 661,779
Int. Cl. C07c 27/00, 49/06, 43/14
U.S. Cl. 260—593                    10 Claims

ABSTRACT OF THE DISCLOSURE

A process for preparing allylic alcohols, allylic ethers and alkyl methyl ketones comprising pyrolyzing hydroxy and alkoxy substituted sulfoxides by heating said sulfoxides to a temperature of from about 150° C. to about 450° C.

BACKGROUND OF THE INVENTION

Field of the invention

The present invention relates to a process for preparing alkyl methyl ketones, allylic alcohols and allylic ethers comprising respectively the step of pyrolzing beta-hydroxyalkyl methyl sulfoxides, gamma-hydroxyalkyl methyl sulfoxides and gamma-alkoxyalkyl methyl sulfoxides.

Description of the prior art

Walling and Bollyky in the September 1964 issue of the Journal of Organic Chemistry, volume 29, pages 2699–2701, describe the pyrolysis of alkyl methyl sulfoxides to olefins. The alkyl methyl sulfoxides of the prior art are quite dissimilar from the substituted sulfoxides which are utilized in the process of this invention and which theoretically could eliminate water or an alcohol as the first step in pyrolysis. It is surprising that the methylsulfinyl group in the substituted sulfoxides can be eliminated cleanly without prior or concomitant elimination of another moiety, e.g., water.

SUMMARY

According to a broad aspect of this invention there is provided a process of preparing allylic alcohols, allylic ethers and alkyl methyl ketones comprising pyrolyzing substituted sulfoxides having the formula

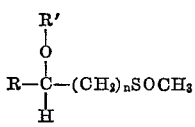

wherein R is selected from the group consisting of alkyl groups, alkoxyalkyl groups, aryl groups, alkylaryl groups and arylalkyl groups, said groups containing from 1 to about 20 carbon atoms and said aryl moieties being selected from the group consisting of phenyl and naphthyl groups; R' is either a hydrogen atom or a group having the same definition as R; and $n$ is an integer which is 1 or 2 when R' is a hydrogen atom and 2 when R' has the same definition as R comprising heating said sulfoxides to a temperature of from about 150° C. to about 450° C. for a time sufficiently long to obtain a substantial yield of pyrolyzate and not less than about ten seconds.

The reactions of the above process are as follows:

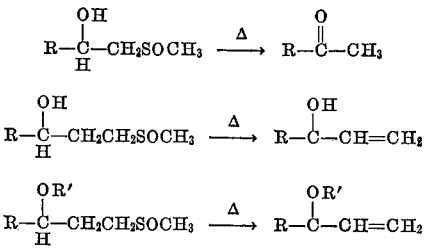

In the equation R can be a methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, 4-decyloxybutyl, 6-methoxydodecyl, 3-dodecyloxypropyl, phenyl, naphthyl, methylphenyl, butylnaphthyl, dodecylphenyl, 2,4-dimethylphenyl, decylphenyl, 6-phenyldodecyl, benzyl, or 2-naphthylethyl group. Preferred R groups are alkyl groups. Preferred R' groups are methyl and ethyl groups.

Suitable examples of sulfoxides which can be utilized in the process of this invention include: 2-hydroxydodecyl methyl sulfoxide; 3-hydroxydodecyl methyl sulfoxide; 3-methoxytridecyl methyl sulfoxide; 2-hydroxy-2-phenylethyl methyl sulfoxide; 3-methoxy-4-phenoxybutyl methyl sulfoxide; 4-phenyl-3-hydroxybutyl methyl sulfoxide; 3-hydroxy-6-naphthyldodecyl methyl sulfoxide; 3-ethoxypentadecyl methyl sulfoxide; 3-benzyloxytridecyl methyl sulfoxide; 3-hydroxy-4-dodecyloxybutyl methyl sulfoxide; 2-hydroxy-3-phenylpropyl methyl sulfoxide; and 3-dodecyloxy-4-dodecyloxybutyl methyl sulfoxide.

Preferred sulfoxides are 2-hydroxybutyl methyl sulfoxide; 3-hydroxypentyl methyl sulfoxide; 3-methoxypentyl methyl sulfoxide; 2-hydroxyundecyl methyl sulfoxide; 3-hydroxy-4-decyloxybutyl methyl sulfoxide.

The temperature of the pyrolysis reaction can vary from about 150° C. to about 450° C. Preferably the temperature is at least about 180° C. Lower temperatures require longer reaction times and higher temperatures require shorter reaction times. The reaction is essentially complete within about 5 to 10 minutes at 250° C.

The above reaction is preferably run without solvent being present, but solvents or diluents can be employed provided they are inert to the starting sulfoxides and the final products. Examples of suitable inert solvents and diluents include diethylene glycol dimethyl ether (diglyme), toluene, xylene, high-boiling petroleum fractions such as kerosene, etc.

The above process is useful for preparing ketones of odd chain lengths and ketones of specific structures, e.g., methyl nonyl ketone which is a material otherwise difficult to obtain. It can be prepared readily by pyrolyzing 2-hydroxyundecyl methyl sulfoxide. The short chain ketones, those having less than about 9 total carbon atoms, are useful solvents. Many of these ketones have good odors. See, e.g., Perfumes, Cosmetics and Soaps, volume 1, Poucher, page 438 (1950), and Perfumes and Their Products, Maurer, pages 261–275 (1959). The disclosures of these books are incorporated herein by reference. The longer chain ketones can be used to prepare alcohols, by hydrogenation, which can in turn be sulfated to give synthetic detergents.

The allylic alcohols are known compounds having known utilities. See, e.g., Chemische Berichte, volume 88, page 1245 (1955); Chem. Abstracts, volume 50, column 11237 (1956). The disclosures of these articles are incorporated hereby by reference.

The allylic ethers are also known compounds. The longer chain allylic ethers, e.g., 3-methoxy-1-hexadecene, can be used as stabilizers for vinyl chloride film. Allylic ethers can be isomerized by known methods using catalysts such as a strong base or iron carbonyl to yield the corresponding vinyl ethers. Short chain vinyl ethers, e.g., 3-methoxy-2-pentene, can be polymerized to form hydrophilic films and can be copolymerized with, e.g., ethylene or graft polymerized on, e.g., polyethylene, to provide films or fibers with improved properties such as printability. The longer chain vinyl ethers derived from isomerization from the instant allylic ethers, e.g., 3-methoxy-2-hexadecene, can be copolymerized with ethylene at a molar ratio of about 1:10 vinyl ether to ethylene to provide internally plasticized films and fibers.

All percentages, parts and ratios herein are by weight unless otherwise specified.

The following examples illustrate the practice of this invention.

EXAMPLES

In the following runs the indicated experimental procedures were used.

Experimental procedures

A. The pyrolyses were carried out by heating 1–5 gram samples at atmospheric pressure in a semi-micro short-path distillation apparatus immersed in an oil bath. The pyrolyzate was distilled into a receiver cooled in a Dry Ice-acetone bath. The time of pyrolysis was between 20 and 30 minutes. The products were isolated from the pyrolyzate by preparative gas chromatography and identified by comparison of their nuclear magnetic resonance and infrared spectra with those obtained on known compounds.

B. The sulfoxide was dissolved in diglyme and refluxed overnight. The solution was then diluted to twice its volume with water and extracted with hexane. The hexane was stripped off, and the residue was taken up in petroleum ether. The insoluble starting material was filtered off, and the petroleum ether was stripped off. The product was identified by comparison of spectra and gas chromatographic retention time with those obtained on a bonafide sample.

C. The sulfoxide sample was placed in a combustion tube. The tube was degassed with full pump vacuum and sealed, then heated in a phenol bath at 180° C. for 2¾ hours. The tube was removed, cooled to 80° C., and opened. The oil in the tube was extracted with chloroform, and solvent was stripped from the extract. The oil remaining was distilled on a semi-micro distillation apparatus. Identification was made as in procedure B.

results are obtained in that the corresponding ketones, allylic ethers and allylic alcohols are produced: 2-hydroxydodecyl methyl sulfoxide; 3-hydroxydodecyl methyl sulfoxide; 3-methoxytridecyl methyl sulfoxide; 3-methoxy, 4-phenoxybutyl methyl sulfoxide; 4-phenyl, 3-hydroxybutyl methyl sulfoxide; 3-hydroxy,6-naphthyldodecyl methyl sulfoxide; 3-ethoxypentadecyl methyl sulfoxide; 3-benzyloxytridecyl methyl sulfoxide; 3-hydroxy,4-dodecyloxybutyl methyl sulfoxide; 2-hydroxy,3-phenylpropyl methyl sulfoxide; 3-dodecyloxy,4-dodecyloxybutyl methyl sulfoxide; and 2-hydroxy-2-phenylethyl methyl sulfoxide.

When, in the above examples, the sulfoxides are dissolved in ten times their weight of diethylene glycol dimethyl ether, toluene, xylene or kerosene, substantially equivalent results are obtained in that the same ketones, allylic ethers and allylic alcohols are produced.

What is claimed is:

1. A process for pyrolyzing hydroxy and alkoxy substituted sulfoxides having the general formula

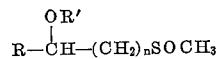

wherein R is selected from the group consisting of alkyl groups, aryl groups, alkyl aryl groups and aryl alkyl groups, said groups containing from 1 to about 20 carbon atoms and said aryl moieties being selected from the group consisting of phenyl and naphthyl groups; R' is selected from the group consisting of a hydrogen atom and a group having the same definition as R; and $n$ is an integer which is 1 or 2 when R' is a hydrogen atom and 2 and R' has the same definition as R comprising heating said sulfoxides to a temperature of from about 150° C. to about 450° C. for a time sufficiently long to obtain a substantial yield of pyrolyzate and not less than about ten seconds.

2. The process of claim 1 wherein the temperature is at least 180° C.

3. The process of claim 1 wherein $n$ is 1 and R' is a hydrogen atom.

4. The process of claim 1 wherein $n$ is 2 and R' is a hydrogen atom.

5. The process of claim 2 wherein $n$ is 2 and R' is an alkyl group.

6. The process of claim 5 wherein R' is selected from the group consisting of ethyl and methyl groups.

7. The process of claim 1 wherein the sulfoxide is dissolved in a solvent selected from the group consisting

| Sulfoxide R in RS(O)CH₃ | Procedure | Pyrolysis temp. (° C.) | Product | Yield, percent |
|---|---|---|---|---|
| 1. 2-hydroxybutyl | A | 210–225 | 2-butanone | 87 |
| 2. 3-hydroxypentyl | A | 215 | 1-penten-3-ol | 84 |
| 3. 3-methoxypentyl | A | 225–230 | 3-methoxy-1-pentene | 84–89 |
| 4. 2-hydroxyundecyl | B | 165 | 2-undecanone | ~3 |
| 5. 3-hydroxy-4-decyl-oxybutyl | C | 180 | 4-decyloxy-1-buten-3-ol | 90 |

2-butanone, 1-pentene-3-ol, 3-methoxy-1-pentene and the other short chain ketones, allylic alcohols, and allylic ethers produced by the processes of this invention are solvents. 2-undecanone and the other higher molecular weight di-alkyl ketones are well-known perfume materials. 4-decyloxy-1-buten-3-ol and the other long chain allylic alcohols and allylic ketones can be used as plasticizers for vinyl resins.

When 2-hydroxy-2-phenylethyl methyl sulfoxide is pyrolyzed at 250° C., according to procedure A of the above examples, acetophenone is obtained in greater than 60% yield. Acetophenone is a valuable well-known perfume material.

When, in the above examples, the following sulfoxides are substituted for the sulfoxides, e.g., 2-hydroxybutyl methyl sulfoxide on a molar basis, substantially equivalent of diethylene glycol dimethyl ether, toluene, xylene and kerosene.

8. The process of claim 3 wherein R is an alkyl group.
9. The process of claim 4 wherein R is an alkyl group.
10. The process of claim 5 wherein R is an alkyl group.

References Cited

Jones: "Proc. Chem. Soc. (London)," p. 81 (1964).
Bloch: "Ann. Chim.," pp 424 to 426 (1965).

LEON ZITVER, Primary Examiner

N. P. MORGENSTERN, Assistant Examiner

U.S. Cl. X.R.

260—590, 592, 611, 612, 613, 614, 615, 618, 632